US012039700B2

(12) United States Patent
Ito

(10) Patent No.: US 12,039,700 B2
(45) Date of Patent: Jul. 16, 2024

(54) IMAGING PROCESSING DEVICE AND IMAGING PROCESSING SYSTEM CAPABLE OF PERFORMING COLLATION IN CAPTURED IMAGE HAVING OVEREXPOSED PORTION

(71) Applicant: FUJIFILM Business Innovation Corp., Tokyo (JP)

(72) Inventor: Kensuke Ito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 513 days.

(21) Appl. No.: 17/322,879

(22) Filed: May 17, 2021

(65) Prior Publication Data

US 2022/0188995 A1 Jun. 16, 2022

(30) Foreign Application Priority Data

Dec. 11, 2020 (JP) .................................. 2020-206237

(51) Int. Cl.
*G06T 5/00* (2024.01)
*G06T 5/50* (2006.01)
*G06V 10/46* (2022.01)
*G06V 10/60* (2022.01)

(52) U.S. Cl.
CPC .............. *G06T 5/50* (2013.01); *G06V 10/462* (2022.01); *G06V 10/60* (2022.01)

(58) Field of Classification Search
CPC ............. G06K 7/1443; G06K 7/10732; G06K 7/1413; G06K 7/10821; G06K 7/1417; G06K 7/1447; G06T 2207/10152; G06T 5/001; G06V 10/19; G06V 10/255; G06V 10/7515; G06V 2201/07
See application file for complete search history.

(56) References Cited

U.S. PATENT DOCUMENTS

| | | | |
|---|---|---|---|
| 11,087,105 B1* | 8/2021 | Biasini | G06F 1/1626 |
| 2016/0267304 A1* | 9/2016 | Wu | G06K 7/10722 |
| 2017/0300734 A1* | 10/2017 | Zheng | G06K 19/06037 |
| 2022/0164557 A1* | 5/2022 | Rossetto | G06V 10/17 |

FOREIGN PATENT DOCUMENTS

| | | |
|---|---|---|
| JP | 2009230287 | 10/2009 |
| JP | 2013229698 | 11/2013 |
| JP | 2016018262 | 2/2016 |

OTHER PUBLICATIONS

Brylka, Robert, Ulrich Schwanecke, and Benjamin Bierwirth. "Camera based barcode localization and decoding in real-world applications." 2020 International Conference on Omni-layer Intelligent Systems (COINS). IEEE, 2020.*

* cited by examiner

Primary Examiner — Li Liu
(74) Attorney, Agent, or Firm — JCIPRNET

(57) ABSTRACT

An imaging processing device includes a processor. The processor performs processing of acquiring a captured image which is captured in a state where a light source emits light, extracting an overexposed portion which occurs in the captured image due to the light emission of the light source and which has a predetermined pixel value or more, and setting a region located in an area, which does not overlap with the extracted overexposed portion in the captured image, as a region of a collation target to be collated with a predetermined reference image.

12 Claims, 15 Drawing Sheets

FIG. 5
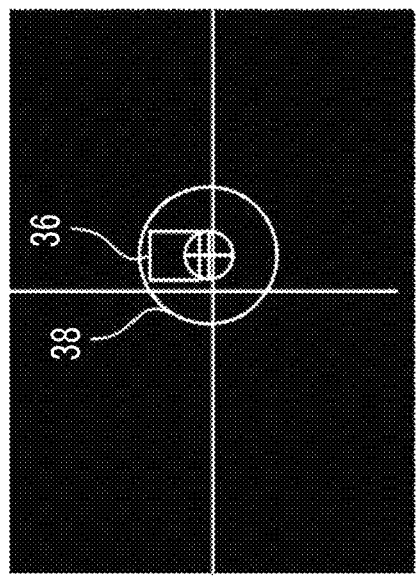
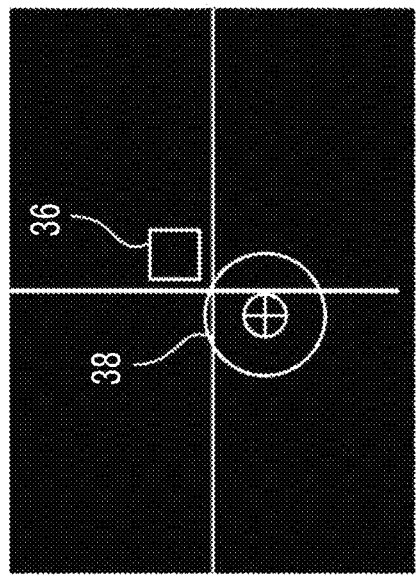
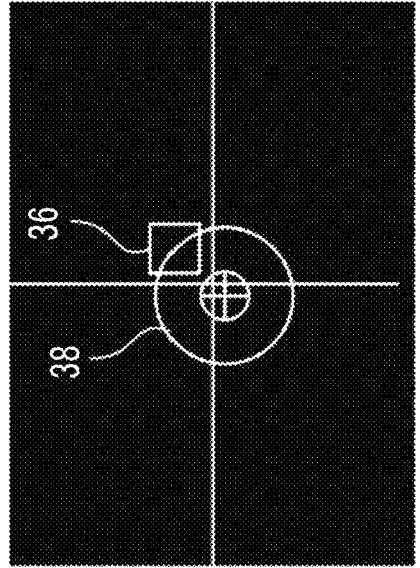

FIG. 7
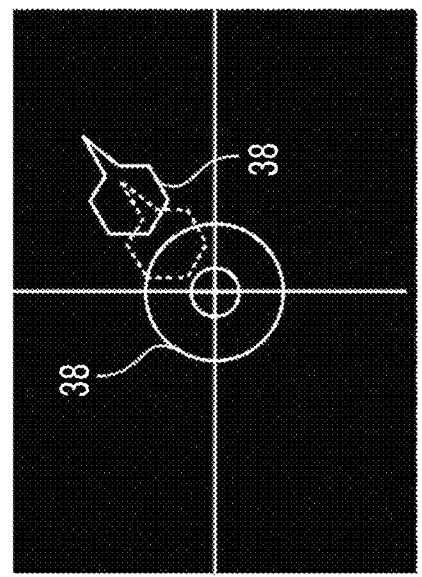
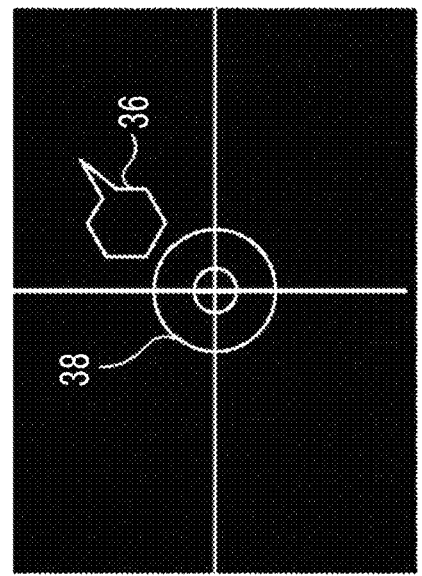
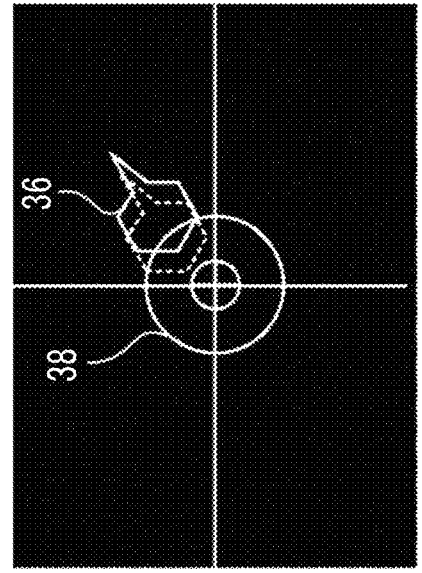

FIG. 8
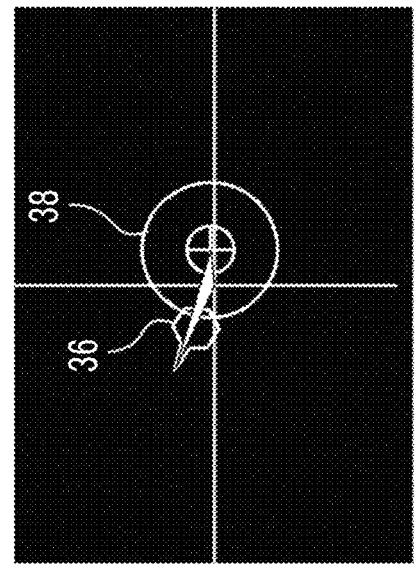
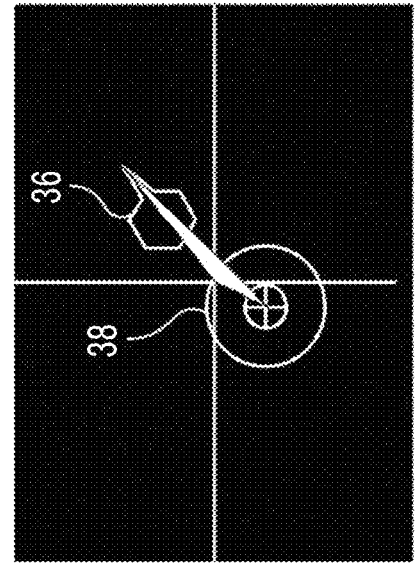
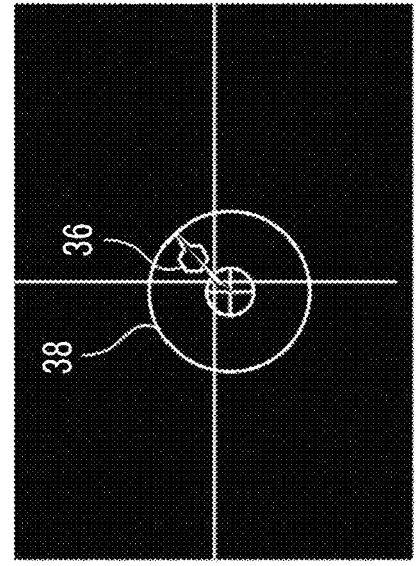

FIG. 9
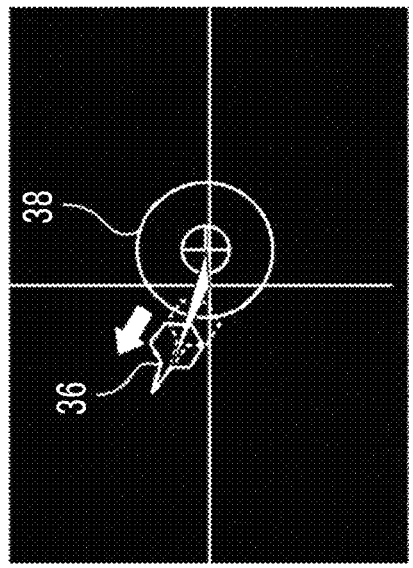
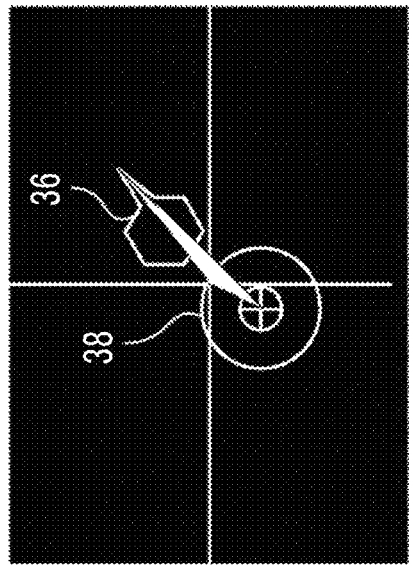
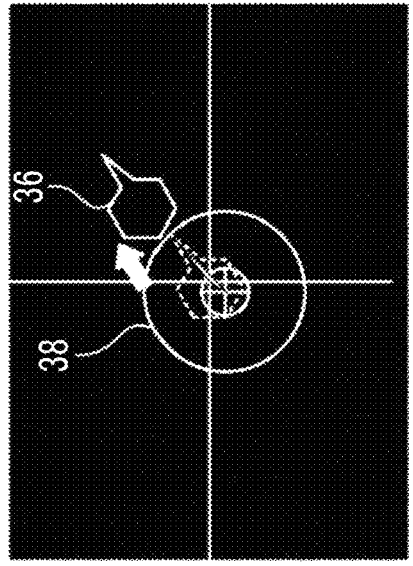

FIG. 11
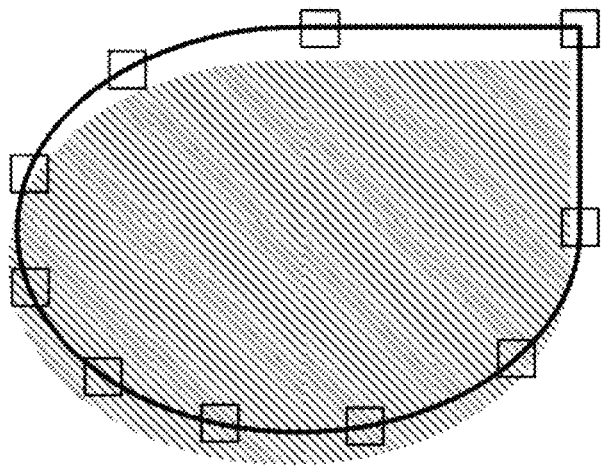
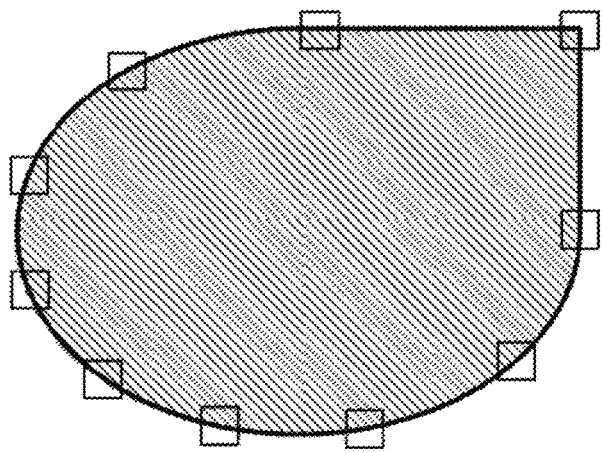
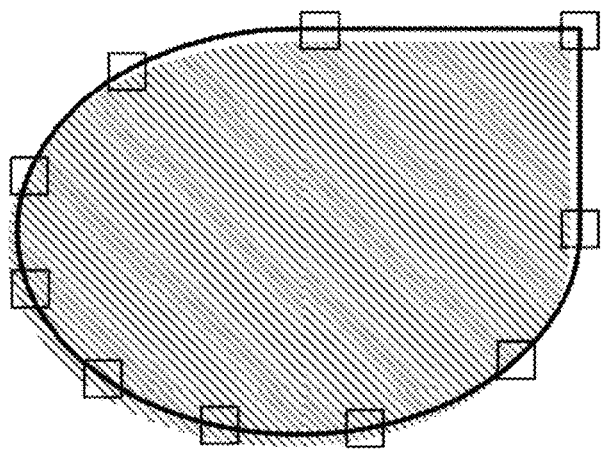

IMAGING PROCESSING DEVICE AND IMAGING PROCESSING SYSTEM CAPABLE OF PERFORMING COLLATION IN CAPTURED IMAGE HAVING OVEREXPOSED PORTION

CROSS-REFERENCE TO RELATED APPLICATIONS

This application is based on and claims priority under 35 USC 119 from Japanese Patent Application No. 2020-206237 filed Dec. 11, 2020.

BACKGROUND

(i) Technical Field

The present invention relates to an imaging processing device and an imaging processing system.

(ii) Related Art

JP2013-229698A proposes an imaging apparatus. In the imaging apparatus, in a case where a control unit acquires an image captured by the imaging unit as a first captured image and then acquires a subsequently captured image as a second captured image, and the overexposed regions respectively detected from the insides of the first and second captured images thereof are not at substantially the same position, the overexposed region in one of the captured images is designated as a region to be corrected, and a region at a position corresponding to the region to be corrected in the other captured image is designated as a region to be extracted, and an image portion extracted from the region to be extracted is combined with the region to be corrected.

JP2009-230287A proposes a digital pen. The digital pen includes: a first infrared LED and a second infrared LED each of which illuminates light on a printed document on which a code image is formed; a light emission control unit that selects an LED which is turned on in a case where a user writes on a printed document; an infrared CMOS that receives the reflected light from the printed document illuminated by the selected LED; and an image processing unit that performs image processing on the light receiving result obtained by the infrared CMOS to acquire a code image, decodes the acquired code image to obtain identification information and position information, detects the occurrence of overexposure in the light reception result, and determines whether to switch the infrared LED to be turned on from the detection result.

JP2016-018262A discloses an analysis image capturing processing system. The analysis image capturing processing system captures an image of the test target object and performs image processing such that the captured image data becomes an image for analysis, in order to analyze the image of the test target object and analyze the test target object. Specifically, in a case where there is a defective portion, from which color information and shape information are unlikely to be obtained, in the image data due to a partial excess or deficiency of the illumination light amount by the light emitting element on the test target object, the information about luminance and color of a predetermined region in which excess or deficiency is unlikely to occur is set as a reference, and luminance conversion is performed for each color on the image data such that information about the luminance and color of the defective portion becomes close to the reference information about the luminance and color.

SUMMARY

In a case where a light source emits light and an image is captured in close proximity to a target object, the light reflected by the target object may cause an overexposed portion in the captured image due to the light emission of the light source. In a case of collating a region of the collation target of the captured image with a predetermined reference image, the overexposed portion and the region of the collation target may overlap. In such a case, it may not be possible to accurately perform the collation.

Therefore, aspects of non-limiting embodiments of the present disclosure relate to an imaging processing device and an imaging processing system capable of imaging a position that does not correspond to an overexposed portion as a region of the collation target.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

In order to achieve the above target object, acceding to an aspect of the present disclosure, there is provided an imaging processing device including a processor. The processor performs processing of acquiring a captured image which is captured in a state where a light source emits light, extracting an overexposed portion which occurs in the captured image due to the light emission of the light source and which has a predetermined pixel value or more, and setting a region located in an area, which does not overlap with the extracted overexposed portion in the captured image, as a region of a collation target to be collated with a predetermined reference image.

BRIEF DESCRIPTION OF THE DRAWINGS

Exemplary embodiment(s) of the present invention will be described in detail based on the following figures, wherein:

FIG. 5 is a diagram showing an example of an overexposed portion and a frame line at a standard position for each type of mobile terminal;

FIG. 7 is a diagram showing an example of moving a frame line to an area that does not overlap with an overexposed portion for each mobile terminal;

FIG. 8 is a diagram showing an example in which triangles are set to be substantially similar, regardless of the models of mobile terminals, where each triangle is formed by three points including a point directly below the center of a camera lens, a point directly below the center of a light source which is an overexposed portion, and a specific portion of a frame line;

FIG. 9 is a diagram showing an example in which triangles are set to be substantially similar and a frame line is moved in a direction away from the center of the light source within the quadrant in which a specific portion of a frame line is present, regardless of the models of mobile terminals, where each triangle is formed by three points including a point directly below the center of a camera lens, a point directly below the center of the light source which is the overexposed portion, and the specific portion of the frame line;

FIG. 11 is a diagram for explaining an example of operation conditions in the example of the automatic shutter;

DETAILED DESCRIPTION

Figure 1:
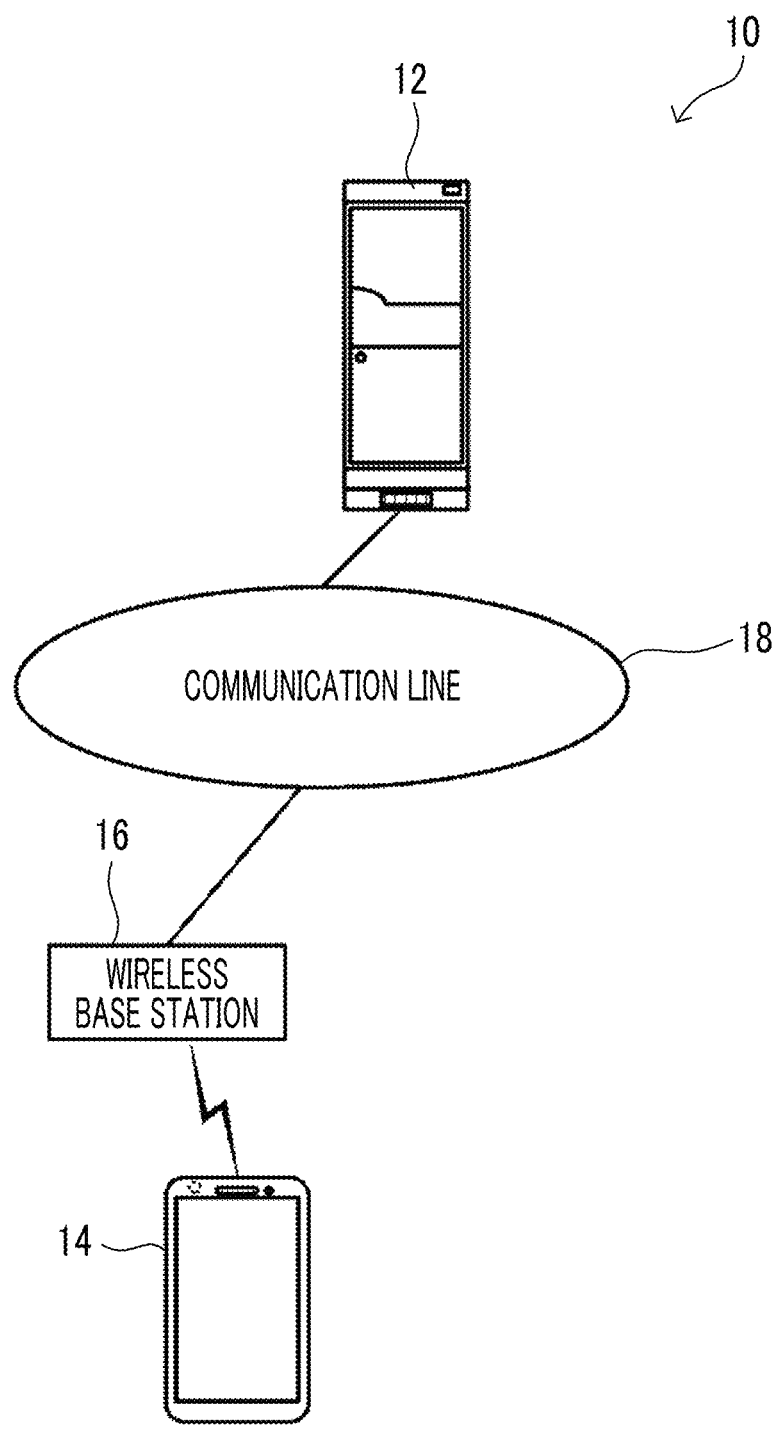
FIG. 1 is a diagram showing a schematic configuration of an information processing system according to the present exemplary embodiment.
Figure 2:
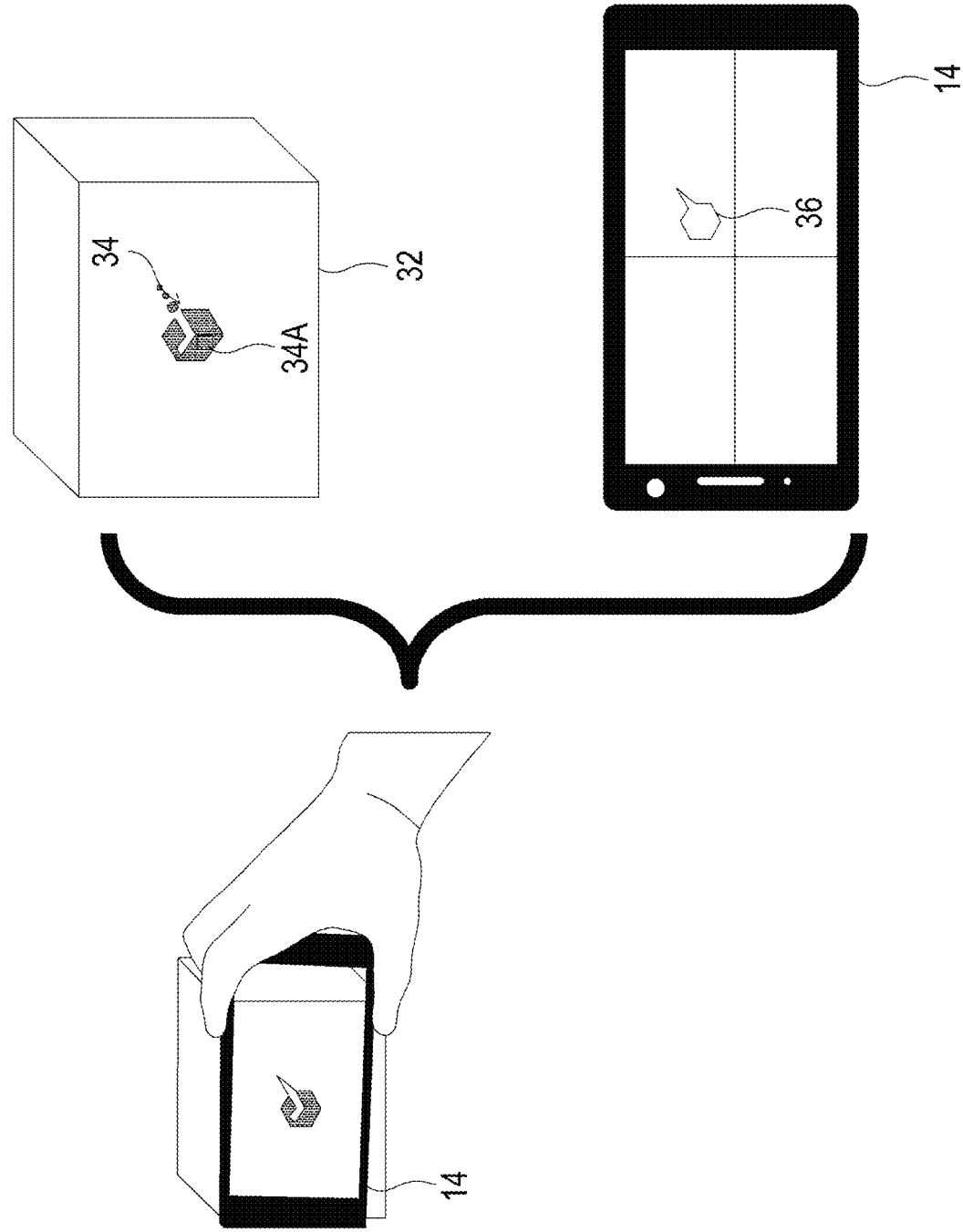
FIG. 2 is a diagram showing a state of imaging a target object using a mobile terminal in the information processing system according to the present exemplary embodiment.

Hereinafter, an example of the present exemplary embodiment will be described in detail with reference to the drawings. In the present exemplary embodiment, an information processing system in which a server and a wireless base station of a mobile terminal are connected to each other via a communication line such as a network will be described as an example of an imaging processing system. FIG. 1 is a diagram showing a schematic configuration of an information processing system 10 according to the present exemplary embodiment. FIG. 2 is a diagram showing a state of imaging a target object using the mobile terminal in the information processing system 10 according to the present exemplary embodiment.

As shown in FIG. 1, the information processing system 10 according to the present exemplary embodiment includes a server 12 and a wireless base station 16 of a mobile terminal 14 as an imaging processing device. The server 12 and the wireless base station 16 are connected to each other via a communication line 18 such as a local area network (LAN), a wide area network (WAN), the Internet, or an intranet.

Specifically, as shown in FIG. 2, the information processing system 10 according to the present exemplary embodiment provides a collation mark 34 on a target object 32 for authenticity determination, provides a collation region 34A for the collation target as a part of the collation mark 34, and registers an image, which is obtained by imaging the collation region 34A in advance, as a reference image in the server 12 in advance. Then, an image of the collation mark 34 of the target object 32 is captured by using the mobile terminal 14, the collation image is acquired, and the server 12 is requested to collate the image with the reference image. Thereby, the image is collated with the reference image registered in advance through the server 12. As a result, the authenticity of the target object 32 is determined. In the present exemplary embodiment, in a case where an image of the collation mark 34 is captured by using the smartphone as the mobile terminal 14, in order to acquire an image with high resolution (for example, 1000 dpi or more), the light source emits light in close proximity to the target object 32, and thereby imaging is performed. Further, in order to capture an image of the target object 32 provided with the collation mark 34 with a sufficient resolution (for example, 1000 dpi or more), an image of the closest target object is captured within the allowable imaging distance of the mobile terminal 14.

The mobile terminal 14 captures an image of the surface of the target object or the like as a predetermined reference image, or captures an image of the collation target to be collated with the reference image. For example, the mobile terminal 14 performs processing of installing an application for collation determination or authenticity determination and capturing the reference image or the collation image through the installed application. As the mobile terminal 14, a smartphone is applied as an example. A smartphone is provided with a light source such as a light emitting diode (LED) light source. Then, in the present exemplary embodiment, an image of the collation mark 34 is captured by a smartphone whose light source position is different for each model.

The server 12 receives a captured image of a predetermined target object from the mobile terminal 14 via the wireless base station 16 and collates the captured image with the reference image registered in advance, thereby performing processing of uniquely identifying the target object and replying the identification result to the mobile terminal 14. The present exemplary embodiment uses a technique of uniquely identifying the target object by using an image of a random pattern accidentally generated on the surface of the target object and determining authenticity thereof. In the present exemplary embodiment, the authenticity determination will be described as an example, but the authenticity determination is not limited to the authenticity determination. For example, a form, in which the server 12 receives a captured image such as a two-dimensional barcode from the mobile terminal 14 and analyzes the captured image to acquire information such as a URL represented by the two-dimensional barcode, may be applied.

Figure 3:
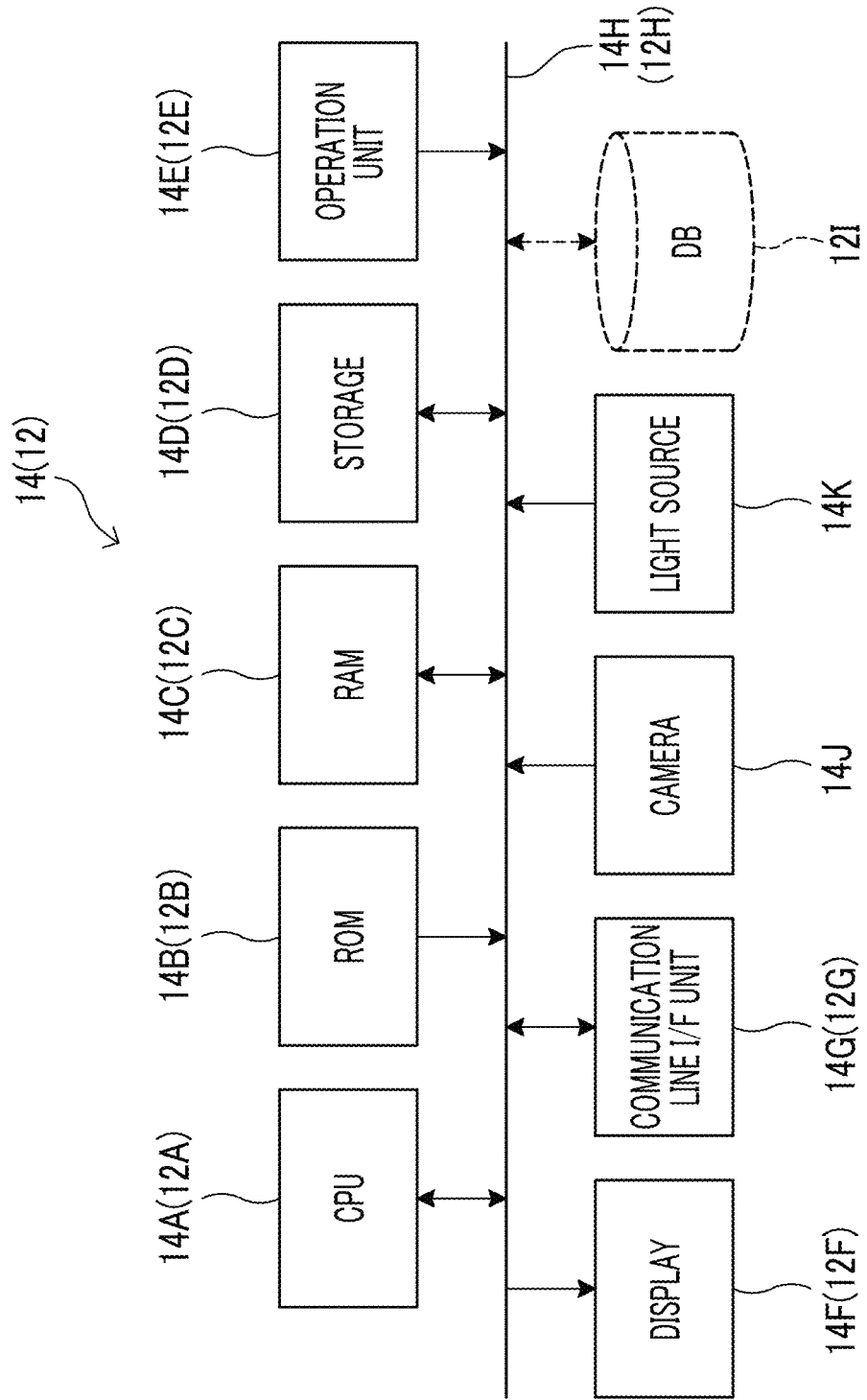
FIG. 3 is a block diagram showing a major configuration of an electrical system of a server and a mobile terminal according to the present exemplary embodiment.

Subsequently, the major configurations of the electrical system of the server 12 and the mobile terminal 14 according to the present exemplary embodiment will be described. FIG. 3 is a block diagram showing a major configuration of an electrical system of the server 12 and the mobile terminal 14 according to the present exemplary embodiment. Since the server 12 and the mobile terminal 14 basically have a general computer configuration, the server 12 will be described on behalf of the mobile terminal 14 only for the differences.

As shown in FIG. 3, the mobile terminal 14 according to the present exemplary embodiment includes a CPU 14A, a ROM 14B, a RAM 14C, a storage 14D, an operation unit 14E, a display 14F, and a communication line interface (I/F) unit 14G. The CPU 14A controls the overall operation of the mobile terminal 14. The ROM 14B stores various control programs, various parameters, and the like in advance. The RAM 14C is used as a work area or the like when executing various programs through the CPU 14A. The storage 14D stores various kinds of data, application programs, and the like. The operation unit 14E is used to input various kinds of information. The display 14F is used to display various kinds of information. The communication line interface unit 14G is made connectable to the communication line 18, and transmits and receives various kinds of data to and from other devices connected to the communication line 18. Each unit of the mobile terminal 14 is electrically connected to each other through the system bus 14H. The mobile terminal 14 according to the present exemplary embodiment will be described with an example in which the storage 14D is provided. However, the present invention is not limited to this, and other non-volatile storage units such as a flash memory may be provided.

Further, the mobile terminal includes a camera 14J and a light source 14K, and is capable of emitting light from the light source 14K to acquire a captured image, which is captured by the camera 14J, and transmitting the captured image to the server 12. As the light source, for example, an LED is applied, but a light source other than the LED may be applied.

With the above configuration, the mobile terminal 14 according to the present exemplary embodiment causes the CPU 14A to access the ROM 14B, the RAM 14C, and the storage 14D, acquire various kinds of data through the operation unit 14E, and display various kinds of information on the display 14F. Further, the mobile terminal 14 causes the CPU 14A to control the transmission/reception of communication data such as captured images through the communication line interface unit 14G.

On the other hand, the server 12 includes a database (DB) 121 in which a predetermined reference image for determining authenticity is stored, and performs processing of determining authenticity by collating a captured image received from the mobile terminal 14 with the reference image.

Figure 4:
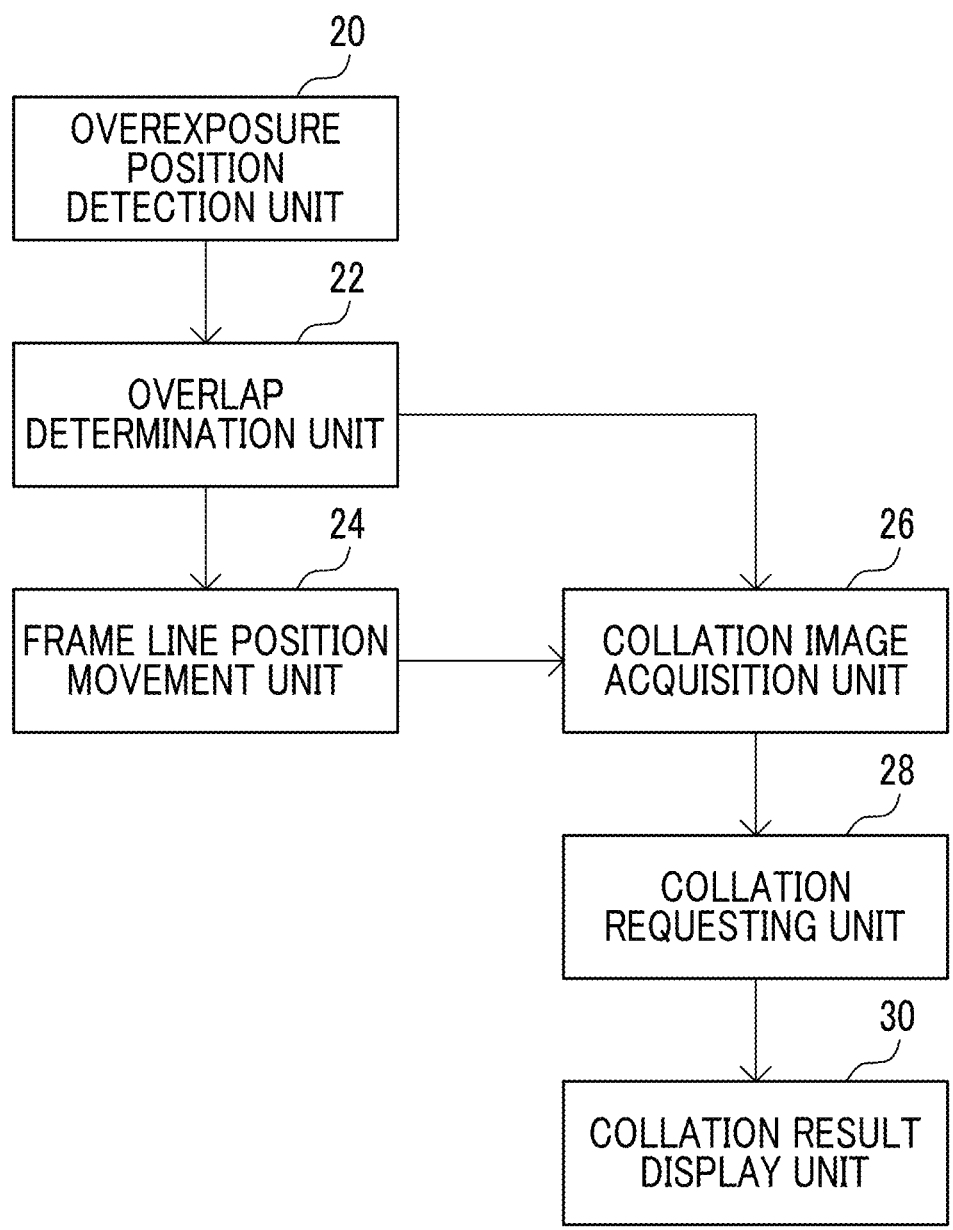
FIG. 4 is a functional block diagram showing a functional configuration of a mobile terminal according to the present exemplary embodiment.

Next, the functional configuration of the mobile terminal 14 will be described. FIG. 4 is a functional block diagram showing a functional configuration of the mobile terminal 14 according to the present exemplary embodiment.

As shown in FIG. 4, the mobile terminal 14 has a functional configuration of an overexposure position detection unit 20, an overlap determination unit 22, a frame line position movement unit 24, a collation image acquisition unit 26, a collation requesting unit 28, and a collation result display unit 30. Each functional configuration is implemented by the CPU 14A reading a program for authenticity determination stored in the ROM 14B or the storage 14D, deploying the program in the RAM 14C, and executing the program.

The overexposure position detection unit 20 causes the light source 14K to emit light and acquires a captured image which is captured by the camera 14J, and extracts, as an overexposed portion, a region which occurs in the captured image due to the light emission of the light source 14K and which has a predetermined pixel value or more, thereby detecting the position of the overexposed portion. The overexposure position occurring in the captured image differs depending on the type of the mobile terminal 14. That is, since the position of the light source 14K with respect to the camera 14J of the mobile terminal 14 is different for each type, the position of the overexposed portion occurring in the captured image is different. For example, as in the mobile terminals A to C shown in FIG. 5, the positions of the overexposed portions 38 are different. In the example of FIG. 5, the circled cross portion indicates the light emitting center of the light source 14K, and the portion which is surrounded by a circle outside the circled cross indicates the overexposed portion 38 having a predetermined pixel value or more. Therefore, the overexposure position detection unit 20 detects the position of the overexposed portion 38 in the captured image, where the position differs depending on the type of the mobile terminal 14. To detect the overexposed portion 38, for example, an image of a target object having a uniform density in a predetermined density range is captured in close range up to a predetermined distance so that the entire field of view has a uniform density, and for example, in a case of an 8-bit grayscale image (256 gradations), an area, in which n or more pixels having a pixel value of 245 or more (for example, 100×100 pixels or more) are adjacent to each other, is extracted as the overexposed portion 38 from a part within the field of view of the captured image. In a case where the overexposed portion 38 is detected, the target object 32 may have a uniform density in a predetermined density range. In such a case, the image thereof may be captured in close proximity to the target object 32 so that the entire field of view has a uniform density.

The overlap determination unit 22 determines whether or not the overexposed portion 38 detected by the overexposure position detection unit 20 overlaps with the collation mark 34 including the collation region 34A of the collation target to be collated with the predetermined reference image. For example, it is determined whether or not the overexposed portion 38 overlaps with the predetermined standard position of the frame line for specifying the image acquisition position displayed on the display 14F. Specifically, in the present exemplary embodiment, as shown in FIG. 2, a frame line 36 as position information indicating the acquisition position of the image to be collated with the reference image is displayed at a predetermined standard position on the display 14F of the mobile terminal 14. Then, when the frame line 36 is aligned with the collation mark 34 including the collation region 34A to be collated with the reference image of the target object 32, the light source 14K is made to emit light, and imaging is performed, it is determined whether or not the overexposed portion 38 and the frame line 36 overlap. For example, in each of the mobile terminals A to C shown in FIG. 5, the positional relationship between the frame line 36 indicated by the square and the overexposed portion 38 surrounded by the circle is different, and there are cases where the frame line 36 and the overexposed portion 38 overlap with each other and does not overlap. Therefore, it is determined whether or not there is overlap. In the example of FIG. 5, the mobile terminal A and the mobile terminal C show an example in which the frame line 36 and the overexposed portion 38 overlap, and the mobile terminal B shows an example in which the frame line 36 and the overexposed portion 38 do not overlap. In the present exemplary embodiment, the frame line 36 will be described as an example having a rotationally asymmetric shape as shown in FIG. 2, but a rectangular frame line 36 may be applied as shown in FIG. 5. Alternatively, a circular or polygonal frame line may be applied. The rotationally asymmetric shape is defined as a shape in which the direction is uniquely determined, unlike a circle, a square, an equilateral triangle, or the like.

In a case where the overlap determination unit 22 determines that the overexposed portion 38 and the frame line 36 overlap, the frame line position movement unit 24 moves the frame line 36 to an area that does not overlap with the overexposed portion 38 and displays the frame line 36 on the display 14F. In the present exemplary embodiment, the collation region 34A in the collation mark 34 shown in FIG.

Figure 6:
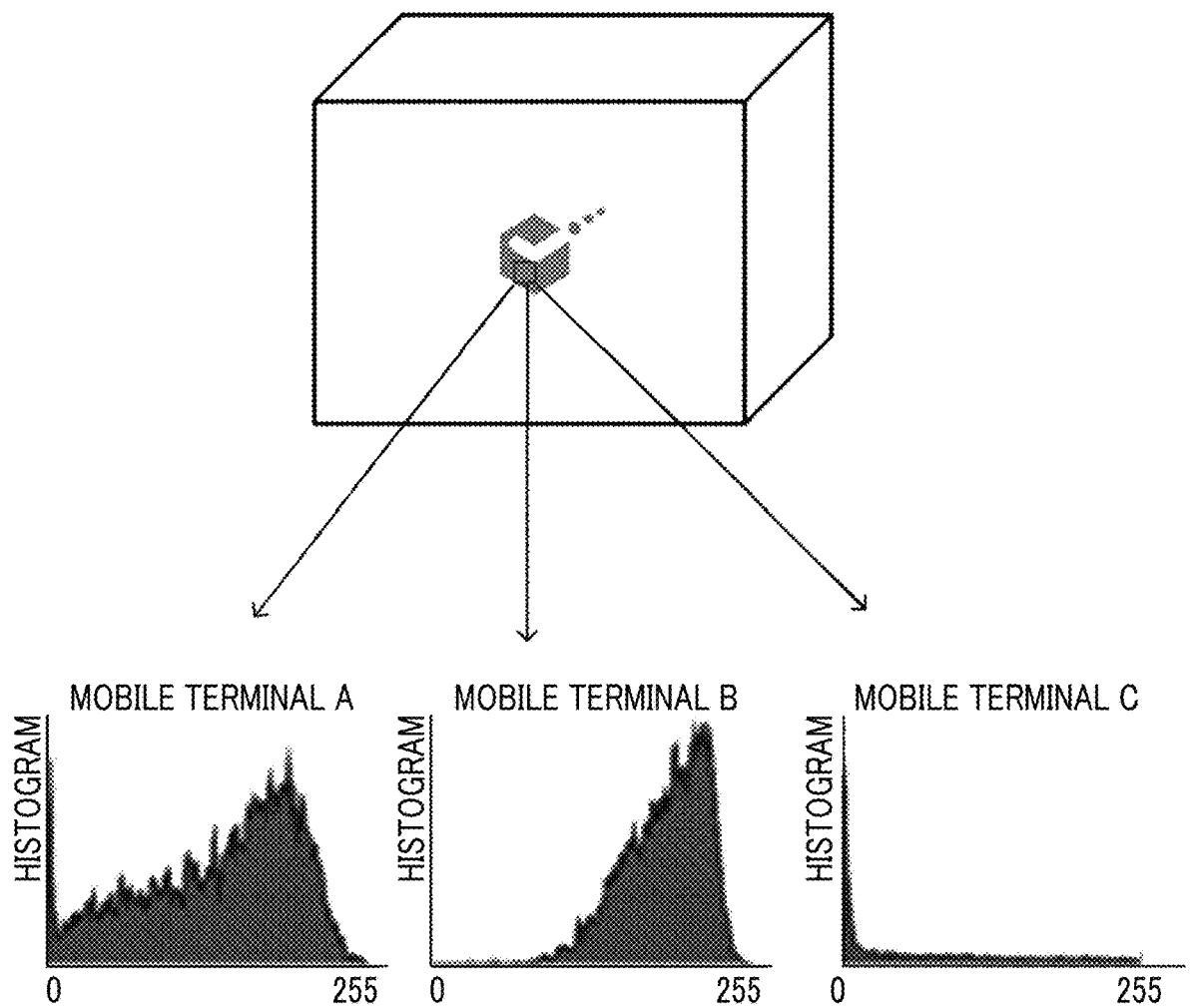
FIG. 6 is a diagram showing an example of histogram distributions of pixel values in a collation region in a case where images of collation marks are captured by mobile terminals A to C.

2 is collated with the reference image obtained by imaging the collation region 34A in advance. However, similarly to the mobile terminal A and the mobile terminal C shown in FIG. 5, in a case where the frame line 36 and the overexposed portion 38 overlap, it is difficult to accurately collate the overexposed portion 38 with the reference image. Therefore, the frame line position movement unit 24 moves the frame line 36 to an area that does not overlap with the overexposed portion 38, displays the frame line 36 on the display 14F, such that an imaging instruction is received. For example, FIG. 6 shows an example of the histogram distributions of the pixel values of the collation region 34A in a case where images of the collation marks 34 are captured by the mobile terminals A to C. As shown in FIG. 6, in the mobile terminal A and the mobile terminal C, since the distribution of pixel values of 0 is large and the distribution is not uniform, there is a high possibility that accurate collation cannot be performed. In the mobile terminal B, the pixel values are uniformly distributed, and accurate collation can be performed.

Through the movement of the frame line 36 to an area that does not overlap with the overexposed portion 38, the frame line 36 is constantly displayed in the same quadrant regardless of the type of the mobile terminal 14, for example, assuming that the origin is set directly below the center of the light source 14K viewed on the display 14F, in the display 14F displaying the frame line 36. Since an uneven target object or a bright body is affected by the direction of light of the light source 14K, it is necessary that the position of the frame line 36 is moved so as to be close to the light source 14K in the positional relationship at the time of capturing the reference image. For example, in the mobile terminals A to C used for collation with the reference image and the mobile terminal 14 for registering the reference image or the registration machine consisting of a camera or lighting, the frame line 36 is constantly set in the first quadrant for lighting. Thereby, the direction is constantly maintained. Then, in the first quadrant, the position is moved so as to avoid the overexposed portion, that is, the position is moved in the direction away from the origin. For example, as shown in FIG. 7, in the mobile terminal A and the mobile terminal C, the frame line 36 is moved from the position indicated by the dotted line to the position indicated by the solid line. In the mobile terminal B, the overexposed portion 38 and the frame line 36 do not overlap, and thus the frame line 36 is not moved.

Alternatively, in a case where the frame line 36 is displayed on the display 14F, regardless of the model of the mobile terminal 14, a triangle formed by three points including a point directly below the center of the lens which is the center of the field of view of the camera 14J, a point directly below the center of the light source 14K which is the overexposed portion 38, and a predetermined specific portion of the frame line 36 is made to have a substantially similar shape, regardless of the optical system and the various mobile terminals 14 at the time of capturing the reference image. In other words, the triangle formed by the three points of the camera 14J directly below the lens center, the light source 14K directly below the center, and the specific portion of the frame line 36 is calculated so as to have a similar shape to the triangle at the time of capturing the reference image. Thereby, the positional relationship between the light source 14K and the center of the lens is maintained at the time of capturing the reference image and at the time of capturing the collation image. At this time, the frame line 36 is moved in a direction away from the center of the light source 14K within the quadrant in which the specific portion of the frame line 36 whose origin is directly below the center of the lens as the center of the field of view of the camera is present. For example, as shown in FIG. 8, for each of the mobile terminals A to C, the position of frame line 36 is calculated such that the triangle formed by the three points including the center of the field of view of the camera 14J, the center of the circled cross just below the center of the light source 14K, and the specific portion of the frame line 36 has a similar shape. In FIG. 8, the frame line 36 is also shown in a similar shape. Then, as shown in FIG. 8, the frame line 36 is moved as necessary so that the frame line does not overlap the overexposed portion 38. At this time, in a case where the origin is set directly below the center of the lens as the center of the field of view of the camera, the frame line 36 is moved in the direction away from the center of the light source 14K within the quadrant in which the specific portion of the frame line 36 is present, as indicated by the arrow in FIG. 9.

Figure 10:
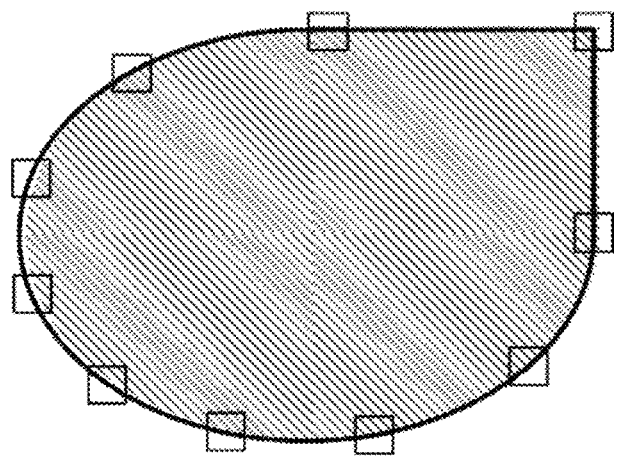
FIG. 10 is a diagram for explaining an example of an automatic shutter.

The collation image acquisition unit 26 acquires a collation image for collation with the reference image by extracting an image of a region corresponding to the frame line 36 as a collation image from the captured image. Here, the collation image acquired from the captured image may be an image of which the overexposed portion does not overlap in the collation region in the collation image, and may be an image of which the overexposed portion is outside the collation region in the collation image. That is, the overexposed portion 38 may appear outside the collation region of the collation image. Further, the collation image acquisition unit 26 may extract and acquire a collation image from the captured image which is captured by receiving an imaging instruction. However, a collation image may be extracted and acquired from the captured image by aligning the frame line 36 with the collation mark 34 shown in FIG. 10 and capturing the image through release of the automatic shutter in a case where the frame line 36 is aligned with the frame line 34. The hatching in FIG. 10 indicates the collation mark 34, and the solid line indicates the outline of the collation mark.

As an example of the automatic shutter, for example, assuming that the average density of y % pixels connected to each other in the n×n pixels is d1 and the average density of pixels other than these is d2, d1/d2 is m, and y and m are determined in advance. For example, in 8-bit gray scale, d1=35, d2=200, and the like, the d1 side is set as the collation mark side of solid silver printing, and the d2 side is set as the background paper. For example, it is determined that there is matching therebetween in a case where there are 10 rectangles on the frame line 36 shown in FIG. 10 having appropriate y and m, and the shutter is released. In this case, the degree of matching with the mark changes depending on the parameters such as the rectangle size, y, and m. For example, in the case of the degree of matching in the upper row of FIG. 11, the automatic shutter is not released, and in the case of the degree of matching in the middle row, the automatic shutter is released. In the case of the degree of matching in the lower row, the automatic shutter is released depending on the setting of the threshold value.

Figure 12:
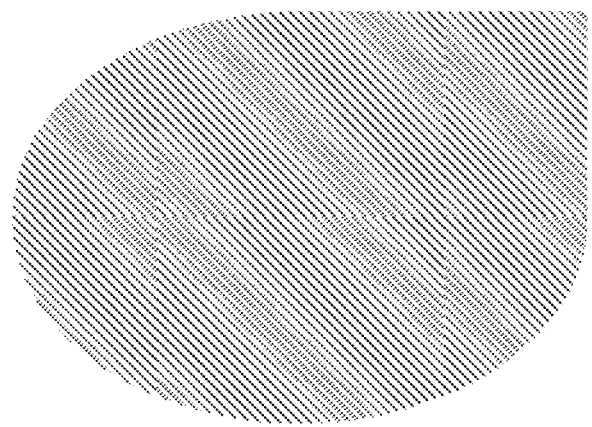
FIG. 12 is a diagram showing an example of a template corresponding to a shape of a collation mark.

Alternatively, imaging may be performed through release of the automatic shutter on the basis of template matching. For example, a template corresponding to the shape of the collation mark 34 shown in FIG. 12 may be prepared, and the automatic shutter may be released in a case where the degree of matching between the captured image and the template is greater than a predetermined value. For example, the circumscribed frame may be extracted and the degree of matching may be calculated only with this frame, or the inside of the frame may be uniformly filled with a constant density and the degree of matching may be calculated with the template side having a uniform density. Then, an image in which the degree of matching is equal to or greater than the predetermined value is acquired as a captured image. Like a moving image, images are constantly captured in during a period of operation of the collation application, pattern matching operations therefor are sequentially calculated in the mobile terminal 14, and captured images are acquired in a case where the values thereof are within a predetermined threshold value.

In the present exemplary embodiment, the collation image acquisition unit 26 performs processing of extracting the region of the collation image from the captured image, but may perform processing of transmitting the captured image to the server 12 and extracting the region of the collation image on the server 12 side.

The collation requesting unit 28 requests the collation between the reference image and the collation image by transmitting the collation image acquired by the collation image acquisition unit 26 to the server 12.

The collation result display unit 30 receives the result of collation between the reference image and the collation image from the server 12 and performs processing of displaying the result of collation on the display 14F.

On the other hand, the server 12 receives the collation image transmitted from the collation requesting unit 28 and collates the collation image with the reference image registered in advance, thereby performing processing of uniquely identifying the target object and replying the identification result to the mobile terminal 14. In the present exemplary embodiment, for example, the reference image of the collation region 34A in the collation mark provided on the target object 32 shown in FIG. 2 is registered in advance in the server 12, and the reference image is collated with the collation image. Thereby, processing of determining the authenticity of the target object and replying the determination result to the mobile terminal 14 is performed.

Figure 13:
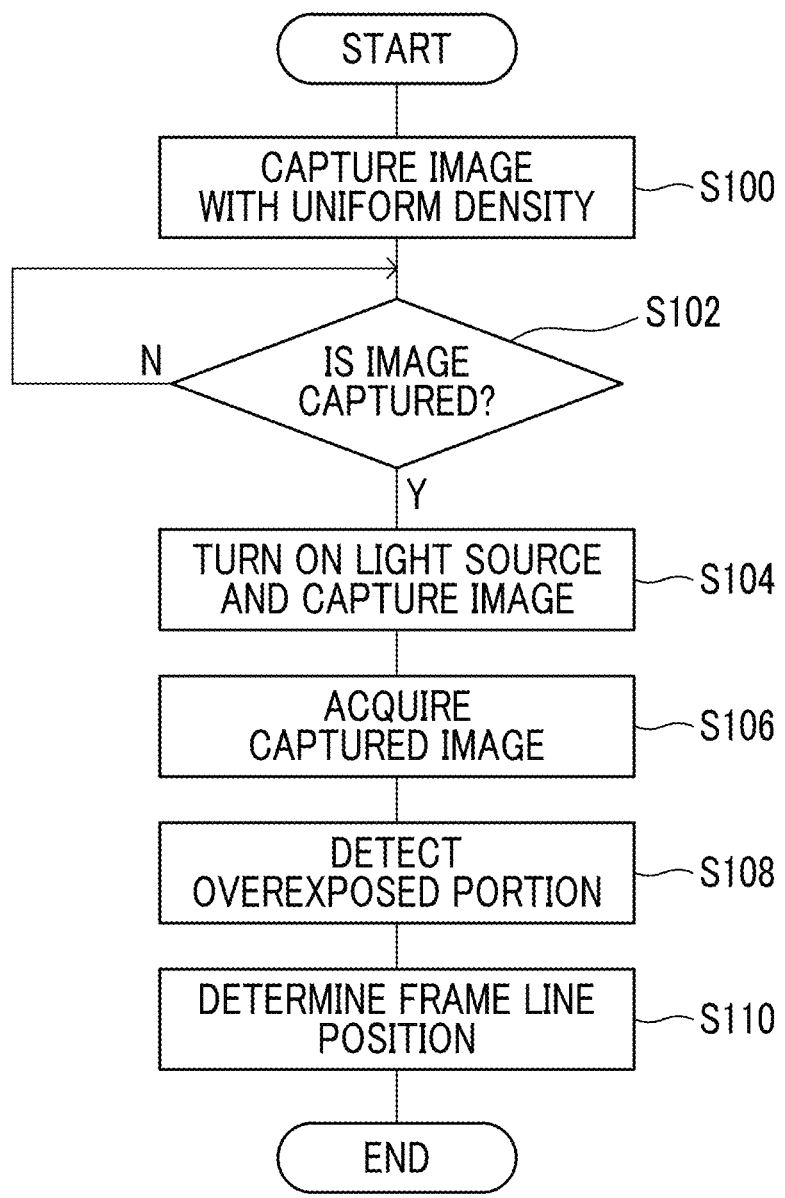
FIG. 13 is a flowchart showing an example of a flow of processing performed in preparation for imaging in a case where a collation image is captured by the mobile terminal of the information processing system according to the present exemplary embodiment.

Subsequently, specific processing performed by the mobile terminal 14 of the information processing system 10 according to the present exemplary embodiment configured as described above will be described. FIG. 13 is a flowchart showing an example of a flow of processing performed in preparation for imaging in a case where a collation image is captured by the mobile terminal 14 of the information processing system 10 according to the present exemplary embodiment. Note that the processing of FIG. 13 starts when, for example, an application for authenticity determination is installed on the mobile terminal 14 and the application is activated for the first time, and thus the processing of FIG. 13 may be omitted when the application is activated for the second time or later.

In step S100, the CPU 14A issues an instruction to capture an image with a uniform density and proceeds to step S102. For example, by displaying a message on the display 14F for close-up imaging of a surface having a uniform density, an instruction for capturing an image with a uniform density is issued. As an example of the uniform density, for example, a surface having a uniform density may be provided on a surface different from the surface on which the collation mark 34 of the target object 32 is provided, and an imaging instruction may be issued.

In step S102, the CPU 14A determines whether or not the image has been captured. In the determination, it is determined whether or not the operation of releasing the shutter of the camera 14J has been performed on the operation unit 14E. The CPU 14A waits until a positive result of the determination is obtained and proceeds to step S104.

In step S104, the CPU 14A turns on the light source 14K, captures an image with the camera 14J, and proceeds to step S106.

In step S106, the CPU 14A acquires a captured image, which is captured by the camera 14J, and proceeds to step S108.

In step S108, the CPU 14A detects the overexposed portion 38 and proceeds to step S110. That is, the overexposure position detection unit 20 extracts, as an overexposed portion 38, a region which occurs in the captured image due to the light emission of the light source 14K and which has a predetermined pixel value or more, thereby detecting the position of the overexposed portion 38.

In step S110, the CPU 14A determines the position of the frame line 36 and ends a series of processing of imaging preparation. That is, the overlap determination unit 22 determines whether or not the overexposed portion 38 detected by the overexposure position detection unit 20 overlaps with the region of the collation target to be collated with the predetermined reference image. For example, it is determined whether or not the overexposed portion 38 overlaps with the predetermined standard position of the frame line 36 for specifying the image acquisition position displayed on the display 14F. In a case where the overexposed portion 38 and the frame line 36 do not overlap, the standard position is determined as the position of the frame line 36. On the other hand, in a case where the overexposed portion 38 and the frame line 36 overlap, the frame line position movement unit 24 moves the frame line 36 to an area that does not overlap with the overexposed portion 38 and displays the frame line 36 on the display 14F. The storage 14D stores the determined position of the frame line 36, and when the application is activated for the second time or later, the processing of FIG. 14 described later may be performed by using the position of the frame line 36 stored in the storage 14D.

Figure 14:
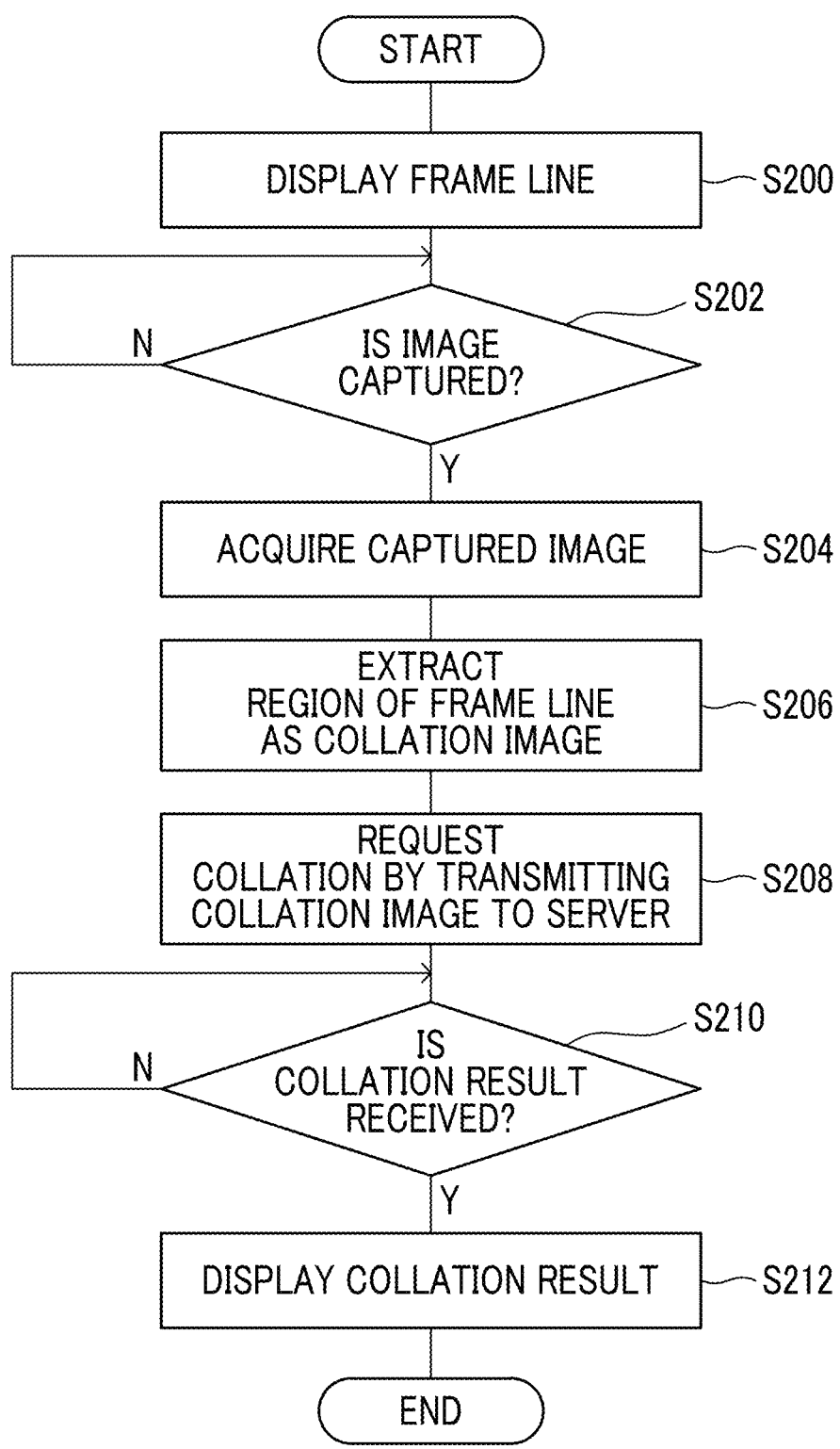
FIG. 14 is a flowchart showing an example of a flow of processing in a case where a collation image is captured by the mobile terminal of the information processing system according to the present exemplary embodiment.

Next, the processing of capturing the collation image, which is performed after the processing of preparing for imaging in FIG. 13, will be described. FIG. 14 is a flowchart showing an example of a flow of processing in a case where the collation image is captured by the mobile terminal 14 of the information processing system 10 according to the present exemplary embodiment. The processing of FIG. 14 may be started following the processing of FIG. 13. Alternatively, the processing may be started following the processing of FIG. 13 when the application is activated for the first time, and may be started from the processing shown in FIG. 14 when the application is activated for the second time, and the processing of FIG. 14 may be performed using the position of the frame line 36 at the first application start.

In step S200, the CPU 14A displays the frame line 36 on the display 14F and proceeds to step S202. That is, the frame line 36 is displayed at the position determined in step S110 described above. As a result, by aligning the collation mark 34 with the frame line 36 and capturing an image, the collation image is captured while avoiding the overexposed portion 38.

In step S202, the CPU 14A determines whether or not imaging is performed. In the determination, it may be determined whether or not the operation unit 14E has received the imaging instruction. Alternatively, the collation image acquisition unit 26 may determine whether or not the degree of matching between the collation mark 34 and the frame line 36 is equal to or greater than a predetermined value. The CPU 14A waits until a positive result of the determination is obtained, and proceeds to step S204.

In step S204, the CPU 14A acquires a captured image, which is captured by the camera 14J, and proceeds to step S206.

In step S206, the CPU 14A extracts an image of the region of the frame line 36 and proceeds to step S208. That is, the collation image acquisition unit 26 acquires a collation image for collation with the reference image by extracting an image of a region corresponding to the frame line 36 as a collation image from the captured image.

In step S208, the CPU 14A transmits a collation image to the server 12, requests collation, and proceeds to step S210. That is, the collation requesting unit 28 requests the collation between the reference image and the collation image by transmitting the collation image acquired by the collation image acquisition unit 26 to the server 12.

In step S210, the CPU 14A waits until the result of collation is received from the server 12, and proceeds to step S212.

In step S212, the CPU 14A displays the result of collation on the display 14F and ends a series of processing. That is, the collation result display unit 30 receives the result of collation between the reference image and the collation image from the server 12 and performs processing of displaying the result of collation on the display 14F. As a result, the authenticity determination result of the target object 32 is displayed on the display 14F.

In the above exemplary embodiment, in step S102, it is determined whether or not the operation of releasing the shutter of the camera 14J is performed on the operation unit 14E, but the processing of step S102 may be omitted. That is, during the display of the through-the-lens image in a case of imaging for the captured image, the overexposed portion 38 may be extracted, the frame line 36 as position information indicating the acquisition position of the image to be collated with the reference image may be displayed on the through-the-lens image in the region that does not overlap with the overexposed portion 38, and the imaging instruction may be received.

Figure 15:
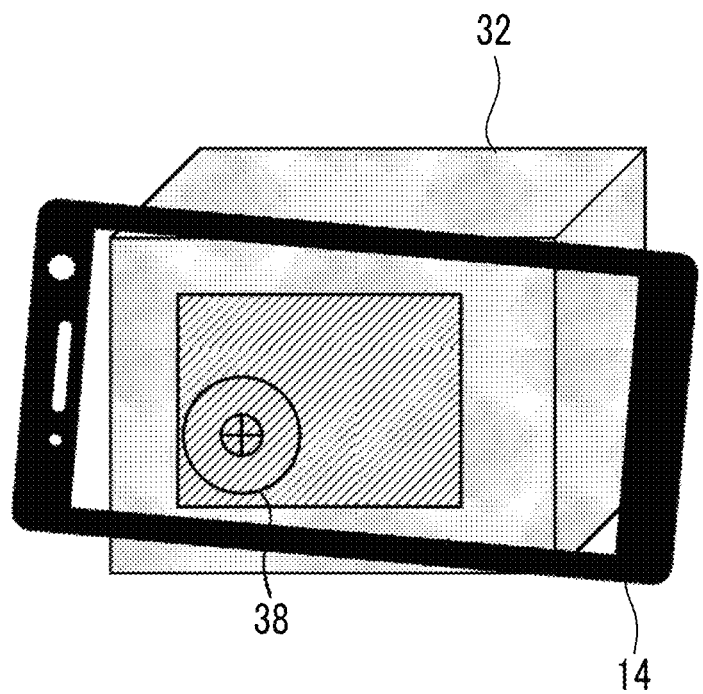
FIG. 15 is a diagram for explaining an example of registering a captured image of a region within a predetermined area as a reference image.

Further, the above exemplary embodiment has been described using the example in which the image of the collation region 34A of the collation mark 34 is extracted by displaying the frame line 36 on the display 14F of the mobile terminal 14 and aligning the frame line 36 with the collation mark 34, and the server 12 collates the image with a reference image. However, the present invention is not limited to this. For example, the display of the frame line 36 may be omitted, and a captured image of a region within a predetermined area may be registered as a reference image as a reference image as indicated by hatching in FIG. 15. By providing a frame or the like on the target object 32 so that the registered predetermined area can be recognized, a captured image is acquired by capturing an image with the mobile terminal 14 according to the frame. Then, the frame indicated by the hatching shown in FIG. 15 may be recognized from the captured image, the image of the region avoiding the overexposed portion 38 among the images of the recognized frame may be acquired as a collation image, and the collation image may be transmitted to the server 12 together with the position information of the collation image with respect to the frame. Thereby, the server 12 is able to determine the authenticity by extracting the reference image corresponding to the position of the collation image with respect to the frame and collating the reference image with the collation image. In this case, the size of the region indicated by the hatching shown in FIG. 15 registered in the server 12 is set to be sufficiently greater than the size of the region of the overexposed portion 38. Therefore, the region in which the overexposed portion 38 is avoided can be used as a collation image.

Further, the above exemplary embodiment has been described using the example in which the collation image is captured by using the mobile terminal 14 and the collation request is made to the server 12. However, the present invention is not limited to this. For example, the collation image may be captured by the camera 14J, the collation image captured by an information processing device such as a personal computer may be captured, and the collation request may be made to the server 12. Alternatively, the server 12 may be omitted, the reference image may be registered in advance in the mobile terminal 14, and a configuration having only the mobile terminal 14 may be made so that the mobile terminal 14 collates the images.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, the processing performed by the mobile terminal 14 in the information processing system 10 according to the above exemplary embodiment may be processing performed by software, processing performed by hardware, or processing as a combination of both. Further, the processing performed by the mobile terminal 14 may be stored as a program in a storage medium and may be distributed.

Further, the present invention is not limited to the above exemplary embodiments, and other than the above exemplary embodiments, the present invention can be modified into various forms without departing from the scope of the invention.

The foregoing description of the exemplary embodiments of the present invention has been provided for the purposes of illustration and description. It is not intended to be exhaustive or to limit the invention to the precise forms disclosed. Obviously, plural modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An imaging processing device comprising;
a storage medium, storing a program; and
a processor, coupled to the storage medium and configured to execute the program stored in the storage medium to perform processing of:
acquiring a captured image which is captured in a state where a light source emits light, extracting an overexposed portion which occurs in the captured image due to the light emission of the light source and which has a predetermined pixel value or more, and setting a region located in an area of the captured image as a region of a collation target to be collated with a predetermined reference image, wherein the area does not overlap with the extracted overexposed portion in the capture image, wherein the processor extracts the overexposed portion while displaying a through-the-lens image in a case of imaging for the captured image, and displays position information which represents a position where an image to be collated with the reference image is acquired, in the region which does not overlap with the overexposed portion, on the through-the-lens image, and the processor displays the position information within a quadrant which is the same as position information in a case of capturing the reference image, assuming that an origin of the captured image is set directly below a center of the light source.

2. The imaging processing device according to claim 1, wherein the processor acquires the captured image, which is captured by approaching a target object having a uniform density in a predetermined density range to a predetermined distance, and extracts the overexposed portion.

3. The imaging processing device according to claim 2, wherein the processor extracts the overexposed portion from the captured image which is captured in a case of displaying position information, which represents a position where an image to be collated with the reference image is acquired, at a predetermined standard position and receiving an imaging instruction, and in a case where the overexposed portion and the position information overlap, the position information is moved and displayed in a region which does not overlap with the overexposed portion.

4. The imaging processing device according to claim 3, wherein the processor displays a frame line having a rotationally asymmetric shape as the position information.

5. The imaging processing device according to claim 1, wherein the processor extracts the overexposed portion from the captured image which is captured in a case of displaying position information, which represents a position where an image to be collated with the reference image is acquired, at a predetermined standard position and receiving an imaging instruction, and in a case where the overexposed portion and the position information overlap, the position information is moved and displayed in a region which does not overlap with the overexposed portion.

6. The imaging processing device according to claim 5, wherein the processor displays a frame line having a rotationally asymmetric shape as the position information.

7. The imaging processing device according to claim 1, wherein the processor displays a frame line having a rotationally asymmetric shape as the position information.

8. The imaging processing device according to claim 1, wherein the processor displays the position information at a position which is moved in a direction away from the origin and which does not overlap with the overexposed portion.

9. The imaging processing device according to claim 1, wherein in a case where an imaging field of view is set as an origin, the processor displays the position information within a quadrant in which a triangle formed by three points including a center of the imaging field of view, a center of the overexposed portion, and a predetermined specific position of the position information is similar to a case of capturing the reference image.

10. The imaging processing device according to claim 9, wherein the processor displays the position information at a position which is moved in a direction away from the overexposed portion and which does not overlap with the overexposed portion, in the quadrant in which the position information is present.

11. The imaging processing device according to claim 1, wherein the processor further performs processing of cutting out an image of the collation target from the captured image in a case where target information representing the region of the collation target provided on a target object is matched with the position information and displaying a result of collation between the image and the reference image.

12. An imaging processing system comprising:
the imaging processing device according to claim 1; and
a server that collates a collation image, which is obtained by cutting out the region of the collation target from the captured image, with the reference image and transmits a result of the collation to the imaging processing device.

* * * * *